(12) United States Patent
Inoue

(10) Patent No.: US 7,304,993 B2
(45) Date of Patent: Dec. 4, 2007

(54) INTERNET SYSTEM

(75) Inventor: Masahiro Inoue, Yamaguchi (JP)

(73) Assignee: Sap Co., Ltd., Yamaguchi (JP)

( * ) Notice: Subject to any disclaimer, the term of this patent is extended or adjusted under 35 U.S.C. 154(b) by 799 days.

(21) Appl. No.: 10/778,588

(22) Filed: Feb. 13, 2004

(65) Prior Publication Data
US 2004/0165599 A1 Aug. 26, 2004

(51) Int. Cl.
H04L 12/28 (2006.01)

(52) U.S. Cl. .................. 370/392; 370/395.52

(58) Field of Classification Search ........... 370/392, 370/395.52, 395.1, 349, 393, 394, 466, 467, 370/469, 471, 473, 426, 401, 338, 331, 352, 370/402, 901; 709/223, 224, 228, 238
See application file for complete search history.

(56) References Cited

U.S. PATENT DOCUMENTS 6,765,920 B1 * 7/2004 Tari et al. .................. 370/401

FOREIGN PATENT DOCUMENTS

| EP | 1003315 A2 * | 10/1999 |
|---|---|---|
| JP | 1999-88407 | 3/1999 |
| JP | 2000-276426 | 10/2000 |
| JP | 2001-236296 | 8/2001 |
| JP | 2001-244985 | 9/2001 |
| JP | 2003-218953 | 7/2003 |
| JP | 2003-249942 | 9/2003 |

* cited by examiner

Primary Examiner—Chi Pham
Assistant Examiner—Alexander O. Boakye
(74) Attorney, Agent, or Firm—Richard M. Goldberg

(57) ABSTRACT

The invention provides an Internet system which can carry out communications among a plurality of clients having terminal computers 1 via intermediate servers while making the locations of transmission sources or receivers secret, wherein specific terminal computers 1 are provided with address converters 2 and transmitting and receiving are carried out by using addresses converted from original addresses that said specific terminal computers 1 have, whereby the Internet system can adapt to various purposes such as to conceal the existence of a transmission source or a receiver, to selectively use a plurality of addresses at a transmission source or receiver side, to use a common converted address at a receiver or transmission source side, to convert information units as necessary, to reject transmission or receiving, etc.

8 Claims, 4 Drawing Sheets

INTERNET SYSTEM

BACKGROUND OF THE INVENTION

1. Field of the Invention

The present invention relates to an Internet system which can realize various functions by being provided with address converters.

2. Description of the Related Art

In conventional Internet systems, different addresses are specified among terminal computers such as personal computers or portable phones of clients, and communications such as e-mail are carried out by using these specified addresses.

However, in the case where such addresses assigned to each terminal computer are used, the locations of clients who have these terminal computers are revealed, and for example, when a client who is a transmission source wants to maintain secrecy that he/she is a transmission source or when a client who is a receiver wants to maintain secrecy that he/she is a receiver, conventional systems cannot meet this demand.

Furthermore, due to addresses specified for each of the terminal computers as transmission sources or receivers, a hacker can easily attack specific clients and cause failures by means of computer viruses.

An object of the invention is, therefore, to provide an Internet system configuration which solves the abovementioned problems in conventional Internet systems and realizes various functions.

SUMMARY OF THE INVENTION

In order to solve the abovementioned problems, in an Internet system which can carry out communications among a plurality of clients having terminal computers via intermediate servers, specific terminal computers are provided with address converters, and transmission and receiving are achieved by using addresses converted from original addresses of the terminal computers.

BRIEF DESCRIPTION OF THE DRAWINGS

FIGS. 1(a) and 1(b) are block diagrams showing the configuration of Embodiment 1, wherein FIG. 1(a) shows a case where a converter for transmission is provided, and FIG. 1(b) shows a case where a converter for receiving is provided.

FIGS. 2(a) and 2(b) are block diagrams showing the configuration of Embodiment 2, wherein FIG. 2(a) shows a case where a converter for transmission is provided, and FIG. 2(b) shows a case where a converter for receiving is provided.

FIGS. 3(a) and 3(b) are block diagrams showing the configuration of Embodiment 3, wherein FIG. 3(a) shows a case where a portable phone is used as a transmission source and a personal computer is used as a receiver, and FIG. 3(b) shows a case where a personal computer is used as a transmission source and a portable phone is used as a receiver.

FIGS. 4(a) and 4(b) are block diagrams showing the configuration of Embodiment 4, wherein FIG. 4(a) shows a case where a converter for transmission is provided, and FIG. 4(b) shows a case where a converter for receiving is provided.

FIGS. 5(a) and 5(b) show the configuration of Embodiment 5, wherein FIG. 5(a) is a block diagram showing a basic principle (A and B show terminal computers, respectively, x and y indicate original addresses that the terminal computers A and B have, respectively, and (x) and (y) show converted addresses that the terminal computers A and B have, respectively), and FIG. 5(b) is a flowchart showing judgement of an intermediate server and operations by an instructing mechanism.

DETAILED DESCRIPTION OF THE INVENTION

Figure 7:
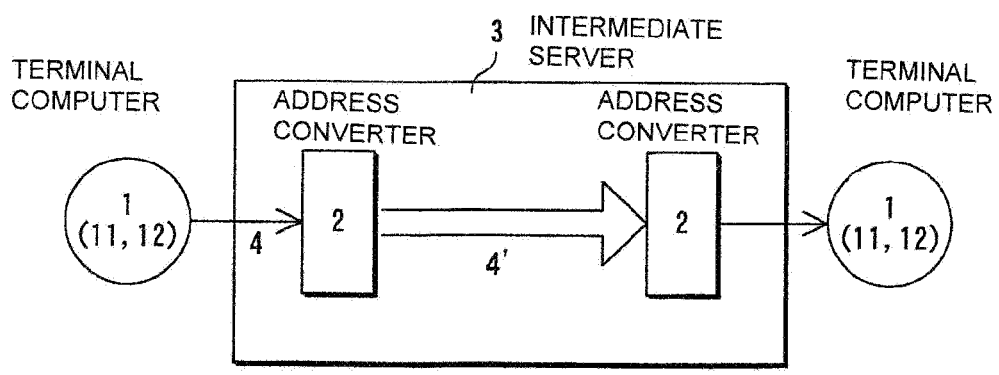
FIG. 7 is a block diagram showing the basic configuration of the invention.

The present invention is characterized in that, as shown in FIG. 7, terminal computers 1 such as a personal computer 11 and a portable phone 12, etc., of specific clients are provided with address converters 2 which can convert original addresses 4 into other specific addresses 4', whereby transmitting and receiving are carried out (FIG. 7 shows a case where both transmitting and receiving are carried out)

The address converters 2 themselves correspond to intermediate servers 3 on the Internet, and within an Internet connection, they can be provided at either a position adjacent to the terminal computer 1 or a position interposed between the terminal computer 1 and another server.

Such address converters 2 are provided, and in a server which controls and administers these address converters 2, in a case where original addresses to be converted are set as confidential, it becomes impossible for a third party to retrieve the original addresses.

In such a case, when a transmission source wants to maintain secrecy that he/she is a transmission source while providing predetermined information, transmitting can be carried out while maintaining transmission source secrecy by keeping the original address to be converted secret although a receiver detects an address that has been converted by the address converter 2.

Maintaining transmission source location secrecy is convenient in cases where, for information exchange on an original equipment manufacturer's product, an original equipment manufacturer informs the original manufacturer's clients or third-party users of necessary information while concealing the OEM manufacturer's location, or confidential information of an organization which is committing illegal acts is revealed by an in-house whistle blower to third parties without disclosing the transmission source's location, etc.

Likewise, in a case where a receiver wants to maintain secrecy that he/she is a receiver when a receiver is provided with predetermined information, an original address to be converted is handled as confidential although an address converted from the original address by the address converter 2 is detected by a transmission source, whereby receiving can be carried out while concealing the receiver.

Thus, concealing the receiver himself/herself is convenient in, for example, a case of a questionnaire survey where a receiver receives specific questionnaires for a survey and answers them while concealing the identity of the receivers receiving and responding to the questionnaires for the survey.

As mentioned above, the system of the invention is very convenient for transmitting anonymous e-mails while concealing the transmission source's or receiver's location.

However, the system of the invention is not necessarily only compatible for the abovementioned confidentiality.

In the Internet system, each terminal computer necessarily has an IP address (an address based on a host address for identifying a computer and a network address for identifying a network which the computer belongs to), and the IP address is normally converted into an address which the computer has selected in the intermediate server.

Therefore, as an embodiment of the invention, it is fully possible that the IP address is employed as an original address.

However, since the IP address can be altered as appropriate inside the Internet system, in an embodiment in which the IP address is employed as an original address, it is necessary that the intermediate server corrects the original address according to this alteration.

EMBODIMENTS

Hereinafter, embodiments to show various availabilities are described.

Embodiment 1

Figure 1A:
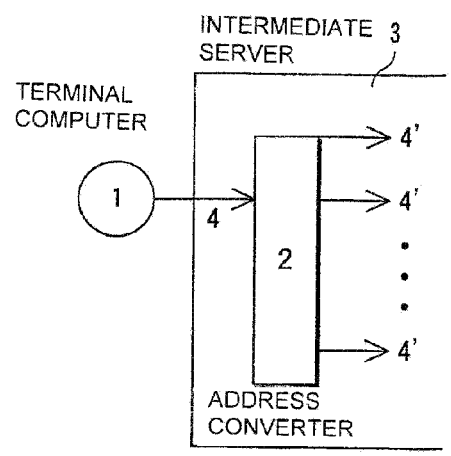
Figure 1B:
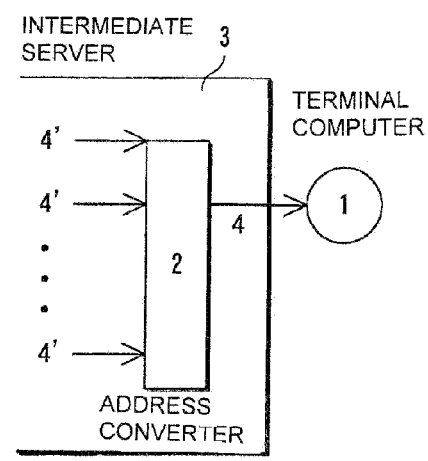

Embodiment 1 is characterized in that a plurality of converted addresses are assigned to one terminal computer 1 as shown in FIG. 1(a) and FIG. 1(b).

In the case of Embodiment 1, a transmission source can selectively use the plurality of converted addresses in accordance with the type of receiver, whereby the transmission source can give multiple receivers the impression as being different persons without specifying the transmission source's location.

Furthermore, in a case where separate converted addresses are assigned to individual receivers, communications with a specific receiver can be carried out by only selecting a converted address code without complicated operations using the receivers' address codes.

When a receiver sets a plurality of converted addresses for one terminal computer 1, correspondence of the receiver to each converted address is set in consideration of the relationship between the receiver and a transmission source, and for example, the converted addresses are changed according to business matters, whereby received information can be immediately categorized as a corresponding matter based on the converted address code.

Embodiment 2

Figure 2A:
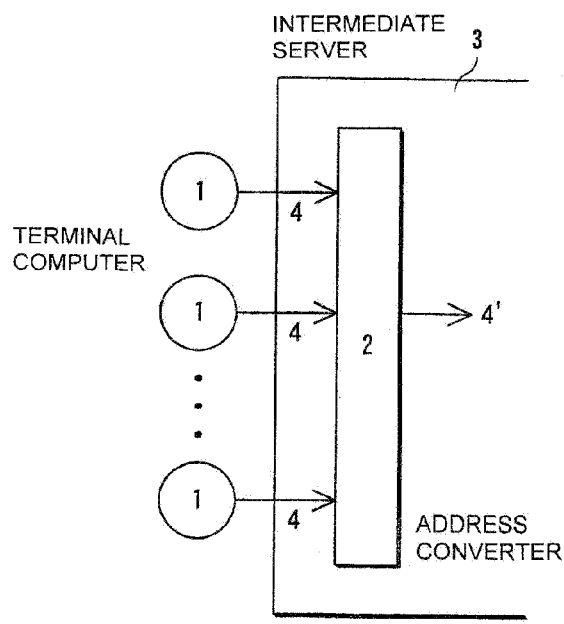
Figure 2B:
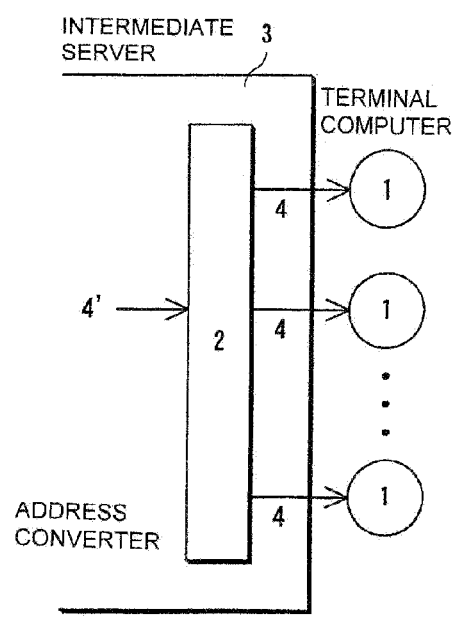

Embodiment 2 is characterized in that, in reverse to the case of Embodiment 1, a plurality of terminal computers have one converted address in common as shown in FIG. 2(a) and FIG. 2(b).

In the case of Embodiment 2, for example, a plurality of client transmission sources can carry out transmitting by using one common mail address. For example, in a case of manufacturing of an OEM product, a plurality of original equipment manufacturers can provide the original manufacturer's clients or third-party users with information on the OEM product by using a converted common mail address while concealing original mail addresses that the original equipment manufacturers individually have.

On the other hand, in a case where a plurality of terminal computers 1 at a receiver side correspond to one converted address, it is possible to carry out transmitting to the plurality of receivers at a time via one converted address, and this is very convenient for transmitting common information such as a advertisement to a plurality of receivers.

In many cases, a client has both a personal computer 11 and a portable phone of using computer 12 (hereinafter, abbreviated to "portable phone") as terminal computers 1, and normally, the personal computer 11 and the portable phone 12 have different addresses from each other.

When transmission addresses or receiving addresses of the personal computer 11 and the portable phone 12 are converted to a common address, in a case where the personal computer 11 uses a line of the UrbanInternet while the portable phone 12 uses a network line of NTT DoCoMo, these lines can be diverted to each other. Therefore, when one of these lines is busy, the other line can be used.

Furthermore, when a converted address is common between the personal computer terminal 11 and the portable phone 12 at a receiver side, selection can be made among receiving by both personal computer terminal and portable phone, receiving by the personal computer 11 during the receiver's presence in his/her office, and receiving by the portable phone 12 during the receiver's absence.

Embodiment 3

Figure 3A:
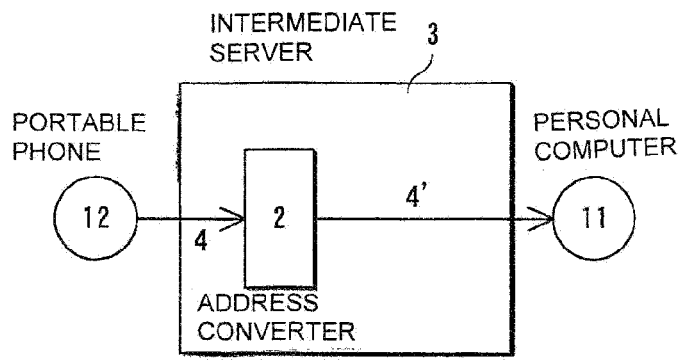
Figure 3B:
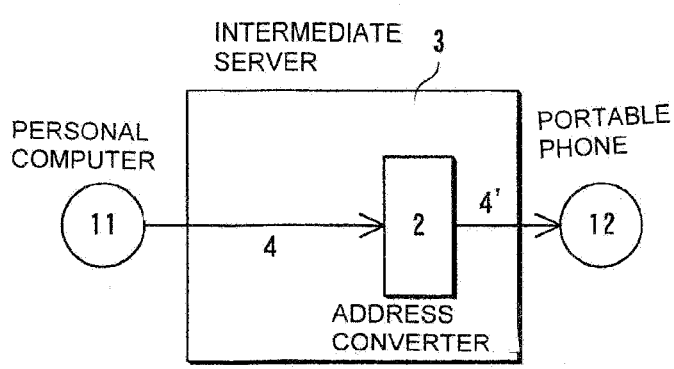

Embodiment 3 is characterized in that, as shown in FIG. 3(a) and FIG. 3(b), the address converter 2 is provided with a mechanism for subsequently accumulating and storing information units to be transmitted or received and converting the information units into information units adapted to information display units of the receiver side, whereby information transmitting or receiving is carried out in the converted information units.

In the case of the portable phone 12, since a screen for displaying transmitting or received information is narrow, the units of information to be transmitted or received inevitably become extremely fewer than those of the personal computer 11.

Therefore, for example, as shown in FIG. 3(a), in a case of information to be transmitted from the portable phone 12 and received by the personal computer 11, fewer information units from the portable phone are subsequently displayed on the screen of the personal computer 11, and it inevitably takes considerable time to complete the display on the screen.

On the other hand, as shown in FIG. 3(b), in a case where the personal computer 11 is a transmission source and the portable phone 12 is a receiver, it inevitably becomes necessary that the portable phone 12 subsequently displays information transmitted from the personal computer 11 on its screen while scrolling.

In Embodiment 3, in all cases mentioned above, the address converter 2 temporarily stores information to be transmitted or received, and then the information is transmitted or received in information units that are used at the receiver side (units adapted to a small display screen in the case of the portable phone 12 as a receiver, and in the case of the personal computer 11, units adapted to a large display screen). Therefore, when the receiver is the personal computer 11, information can be displayed at a time on the screen of the personal computer, and when the receiver is the portable phone 12, the information can be automatically subsequently displayed on the screen without scrolling the screen.

Embodiment 4

Figure 4A:
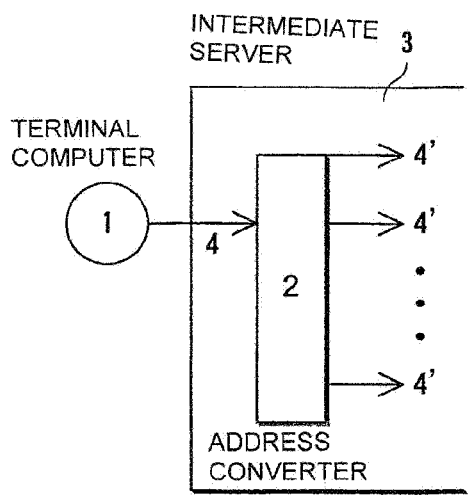
Figure 4B:
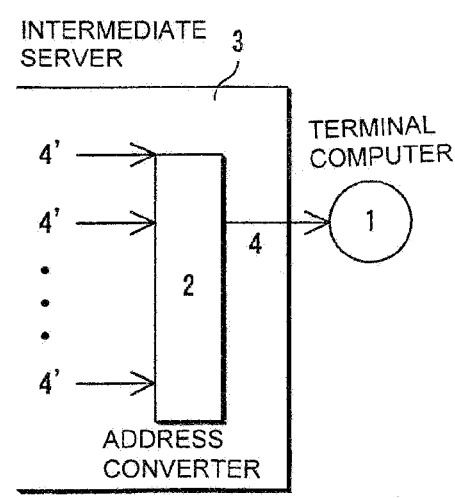

Embodiment 4 is characterized in that, as shown in FIG. 4(a) and FIG. 4(b), the address converter 2 is provided with a mechanism for disabling transmission to or from a client having a specific address.

Normally, terminal computers 1 such as the personal computer 11 and the portable phone 12 are set to be connectable to all lines, and are not designed so as to disable communications with specific destinations.

On the other hand, as in the system of the invention, in a case where a transmission or receiving address converter 2 is provided, the abovementioned mechanism can be provided for this converter.

By providing this mechanism, it becomes possible for a transmission source side to disable transmission to a specific receiver, whereby communications with the specific receiver are shut out and the connection to the specific receiver is cut off. On the other hand, a receiver also becomes able to reject information transmission from a specific transmission source.

Normally, to prevent communications with a specific receiver, transmitting to the specific receiver should not be carried out, however, there is a possibility that transmitting to the specific receiver is carried out by mistake.

In such a case, when the abovementioned mechanism is provided, even if the address number of the specific receiver is inputted, subsequent transmission processes can be turned OFF based on a judgement made by the computer 1 that the server of the converter 2 has.

Likewise, by providing the abovementioned mechanism, when a receiving signal is inputted from a specific transmission source, subsequent receiving processes can be turned OFF based on a judgement made by the computer 1 that the server of the converter has.

To disable receiving (that is, reject receiving), it is also possible that a receiving rejection signal can be transmitted to a transmission source to be rejected, and in this case, the address converter 2 makes the original address secret, whereby the location of the receiver who has transmitted the receiving rejection signal can be concealed.

Embodiment 5

Figure 5A:
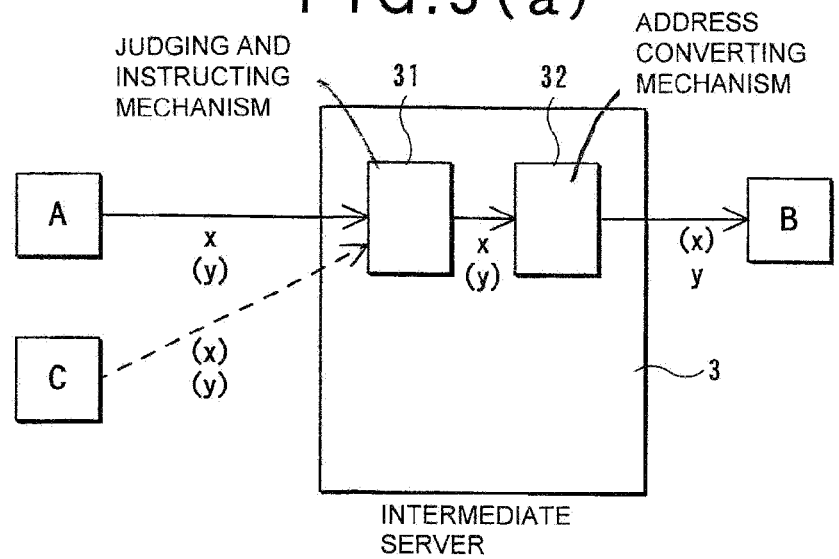
Figure 5B:
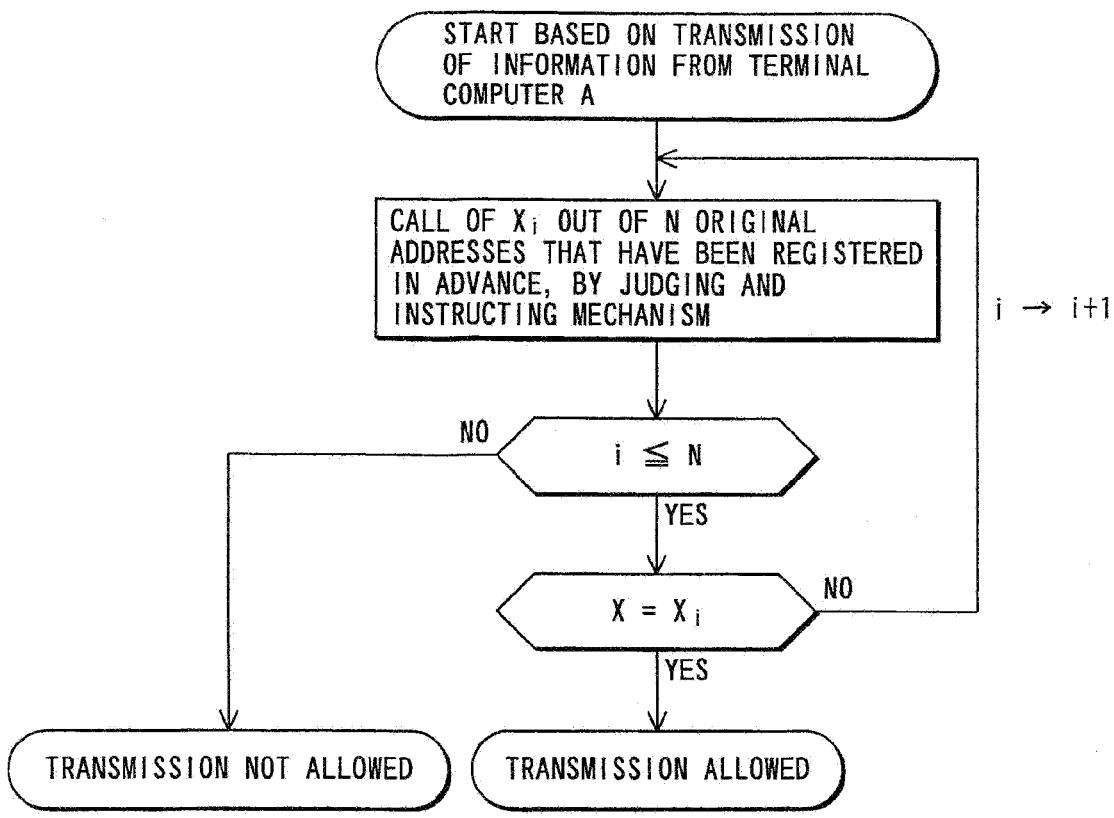

Embodiment 5 is characterized in that, as shown in FIG. 5(a) and FIG. 5(b), based on judgement as to whether or not transmission based on an original address has been carried out, it is judged whether or not transmission is from a corresponding specific terminal computer, and transmission of information without this original address is not permitted.

Concretely, FIG. 5(a) shows the basic configuration of the invention, wherein, in a case where a specific terminal computer A transmits information contents to another specific terminal computer B by using original addresses, that is, in a case where information is transmitted from the terminal computer A that has an original address x to another terminal computer B that has an original address y and a converted address (y), the intermediate server 3 transmits the information in accordance with indication of the original address x and the converted address (y) from the terminal computer A.

In addition, the addresses mentioned above are indications for identifying the terminal computers, and include, not only, for example, e-mail addresses but also telephone numbers of telephones that have the terminal computers, etc.

The intermediate server 3 judges whether or not the original address x has been transmitted in the judging and instructing mechanism 31, and when it is transmitted, the address is converted into a converted address (x) by an address converting mechanism 32, and on the other hand, the converted address (y) that the terminal computer B has is converted into the original address y, and thereafter, the predetermined information is transmitted.

Generally, there is a danger that the converted addresses (x) and (y) that a third party can access are known and used by a third party without permission.

In the abovementioned configuration, there is every possibility that a third party uses the accessible address (x) without permission as the address of the computer C that the third party uses to personate the specific terminal computer A and transmits information based on this personation to another predetermined terminal computer B.

However, in the intermediate server 3, as shown in the flowchart of FIG. 5(b), based on judgement as to whether or not transmission is accompanied by the original address x that has been registered in advance, the judging and instructing mechanism 31 judges whether or not the transmission is from the genuine terminal computer A, and in a case where it is found that the transmission is accompanied by the original address x, the transmission is permitted, and on the other hand, when the transmission is not accompanied by the original address x, the transmission is not permitted and transmission to the other predetermined terminal computer B is prevented (the number of original addresses registered in the intermediate server 3 is set to N in FIGS. 2(a) and 2(b), and the number N is a plurality in many cases).

In FIG. 5(a), description is given as to whether or not an original address x that one specific terminal computer A has is transmitted, however, as a matter of course, another embodiment is also possible in which the number of specific terminal computers whose original addresses are to be converted by the intermediate server 3 is set to be plural and transmission and receiving based on this conversion are carried out among the plurality of terminal computers.

In this embodiment, it becomes possible for users of the plurality of terminal computers whose original addresses have been registered in the intermediate server 3 to prevent transmission based on the third party's personation with each other.

As mentioned above, in the intermediate server 3 of Embodiment 5, in a case where personating signals by use of accessible addresses without permission are prevented from being transmitted to a plurality of terminal computers, to identify registered terminal computers, it is essential that original addresses to be registered in advance are different among the terminal computers.

Embodiment 6

Figure 6:
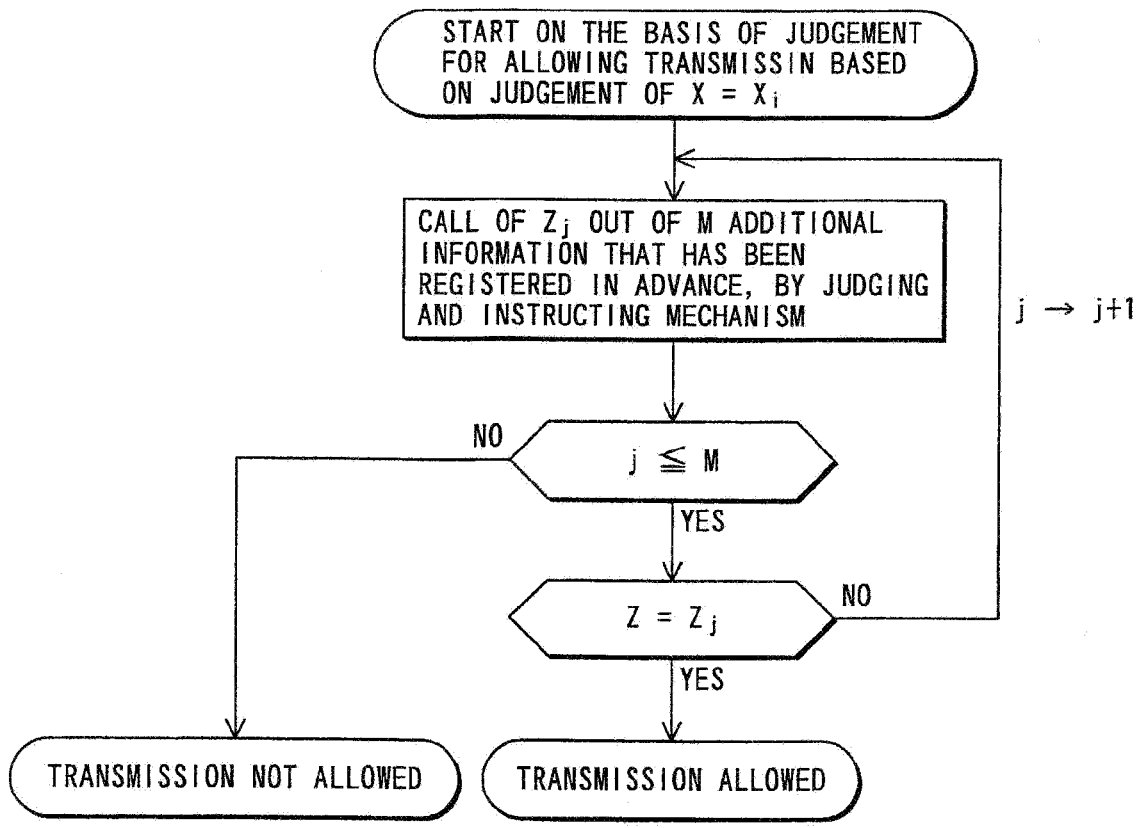
FIG. 6 is a flowchart showing judgement of the intermediate server and operations by the instructing mechanism in Embodiment 6.

Embodiment 6 is characterized in that, as shown in FIG. 6, in Embodiment 5, an additional address is provided as a part of information contents to be transmitted by a specific terminal computer, and in the intermediate server 3, by judging the existence of this additional address, it is judged whether or not transmission is from the corresponding specific terminal computer, and transmission of information without the additional address is not permitted.

In the case of Embodiment 5, it cannot be said that there is zero risk of leakage of the original address to a third party through the intermediate server 3.

In such a case, in Embodiment 6, as shown in FIG. 6, by double judgement as to whether or not a transmission side terminal computer A uses an additional address z based on its inherent information in addition to the judgement as to whether or not the transmission side terminal computer uses the original address, personation of this terminal computer A by a third party is checked, and even when a third party who carries out this personation knows the original address x of the terminal computer A by accident and uses this, transmission of information based on this personation can be checked and prevented by judging whether or not the inherent additional information z has been used for the transmission (In addition, in FIG. 6, the number of terminal computers whose additional information has been registered in advance is set to M, and M is a plurality in many cases.).

In addition, in the case of using additional information z, in order to prevent the contents of z from being accessed by a third party, at the point at which the intermediate server 3 receives the additional information z, it is preferable that transmission to other terminal computers B that are transmission destinations is carried out upon erasing the additional information z.

EFFECT OF THE INVENTION

As described above, the Internet system of the invention is adaptable to various purposes such as to conceal the existence of a transmission source or a receiver, to selectively use a plurality of addresses at a transmission source or receiver side, to use a common converted address at a receiver or transmission source side, to convert information units as necessary, to reject transmission or receiving, etc.

Furthermore, by the abovementioned concealment, terminal computers the addresses of which are to be converted can be prevented from being accessed by hackers as much as possible.

Furthermore, when it is judged whether or not the transmission is from the corresponding specific terminal computer based on judgement as to whether or not transmission based on an original address is carried out and transmission of information that is not accompanied by an original address is not permitted, it can be prevented that a third party personates the terminal computer by using the accessible address that the specific terminal computer has and transmits information based on this personation to other predetermined terminal computers.

As described above, the present invention has multiple effects, and its value is immeasurable.

As mentioned above, the Internet system of the invention has multifaceted effects, and the value thereof is immeasurable.

What is claimed is:

1. An Internet system which can carry out communications among a plurality of clients having terminal computers via intermediate servers, comprising:

address converters associated with specific terminal computers, for converting addresses from original addresses of said specific terminal computers during transmission from and reception to said specific terminal computers, an intermediate server which, based on judgement as to whether or not transmission based on a corresponding original address is carried out, judges whether or not the transmission is from a corresponding specific terminal computer, and prevents transmission of information that is not accompanied by this original address, and wherein a specific terminal computer has an additional address as a part of information contents to be transmitted by the specific terminal computer, and in the intermediate server, it is judged whether or not transmission is from the specific terminal computer based on judgement on the existence of this additional address, and transmission of information without existence of the additional address is not permitted.

2. The Internet system according to claim 1, further comprising servers for keeping the original addresses to be converted secret and for controlling and administering the address converters so that third parties cannot retrieve the original addresses.

3. The Internet system according to claim 1, wherein one terminal computer is provided with a plurality of converted addresses.

4. The Internet system according to claim 1, wherein the plurality of terminal computers have one converted address in common.

5. The Internet system according to claim 4, wherein at least one client includes a personal computer and a portable phone as one said terminal computer and which have the same converted address in common.

6. The Internet system according to claim 1, wherein at least one said address converter is provided with a mechanism which subsequently accumulates and stores information units to be transmitted or received and converts information units so as to adapt to information display units of a receiver side, and transmitting or receiving is carried out in the converted information units.

7. The Internet system according to claim 1, wherein the address converters are provided with a mechanism which disables transmissions to or from clients having specific addresses.

8. The Internet system according to claim 1, wherein the original addresses are IP addresses.

* * * * *